US008317917B2

(12) United States Patent
Arockiadoss

(10) Patent No.: US 8,317,917 B2
(45) Date of Patent: Nov. 27, 2012

(54) GREEN CEMENT FOR SUSTAINABLE CONSTRUCTION

(75) Inventor: Thevasahayam Arockiadoss, Tamil Nadu (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/390,580

(22) PCT Filed: Oct. 19, 2010

(86) PCT No.: PCT/IB2010/054719
§ 371 (c)(1),
(2), (4) Date: Feb. 15, 2012

(87) PCT Pub. No.: WO2012/010936
PCT Pub. Date: Jan. 26, 2012

(65) Prior Publication Data
US 2012/0145043 A1   Jun. 14, 2012

(30) Foreign Application Priority Data
Jul. 20, 2010   (IN) ............................ 2074/CHE/2010

(51) Int. Cl.
C04B 7/24   (2006.01)
(52) U.S. Cl. ........................................ 106/745; 106/769
(58) Field of Classification Search .................. 106/745, 106/769
See application file for complete search history.

(56) References Cited

U.S. PATENT DOCUMENTS

| | | | |
|---|---|---|---|
| 4,206,186 A | 6/1980 | Holter et al. |
| 4,220,475 A | 9/1980 | Tokar et al. |
| 4,224,077 A | 9/1980 | Olifer et al. |
| 5,134,944 A | 8/1992 | Keller et al. |
| 7,229,491 B2 | 6/2007 | Davidovits et al. |
| 2009/0020044 A1 | 1/2009 | Constantz et al. |
| 2010/0010139 A1 | 1/2010 | Davidovits et al. |

OTHER PUBLICATIONS

Babaian et al., Effect of Mechano-Chemical Activation on Reactivity of Cement Kiln Dust: Fly Ash Systems. ACI Material Journal 100(1), Jan.-Feb. 2003, pp. 55-62. (Abstract).
Barker et al., CO2 Capture in the Cement Industry. Energy Procedia, vol. 1, Issue 1, Feb. 2009, pp. 87-94.
Bhatty et al., Properties of Blended Cements Made with Portland Cement, Cement Kiln Dust, Fly Ash, and Slag. Proceedings of the International Congress on the Chemistry of Cement, Theme 3, vol. 1, IV, Brazil, 1986, pp. 118-127.
Bhatty et al., Use of Cement Kiln Dust in Blended Cements. World Cement 15(4), 1984, pp. 126-128 and 131-134.
Blamey et al., The calcium looping cycle for large-scale CO2 capture, Progress in Energy and Combustion Science 36 (2010) 260-279.
Brew et al., Synthesis and characterisation of magnesium silicate hydrate gels, Cement and Concrete Research 35 (2005) 85-98.
Cannon et al, Reaction Mechanism of Calcium-Catalyzed Thermal Regeneration of Spent Granular Activated Carbon Activated Carbon. Carbon, vol. 32, No. 7, pp. 1285-1301, 1994.

(Continued)

*Primary Examiner* — Paul Marcantoni
(74) *Attorney, Agent, or Firm* — Foley & Lardner LLP

(57) ABSTRACT

"Green" cements, which can be carbon neutral or negative, can be prepared at lower temperatures (450° C.-500° C.) by utilizing feed compositions comprising (i) $TiO_2$, $TaO_xN_y$, $TiO_xN_y$, $RuO_2$, Pt, TaO, band gap materials, or a first mixture thereof; (ii) $Al_2O_3$; and (iii) $Ca_2SiO_4$, $MgSiO_2$, $MnSiO_2$, or a second mixture thereof; and spent wash with melanoidin as a binder.

19 Claims, 1 Drawing Sheet

OTHER PUBLICATIONS

Chidankumar et al., Impact of Distillery Spentwash Irrigation on the Yields of Top Vegetables (Creepers). World Applied Sciences Journal 6 (9): 1270-1273, 2009.

Fitzgibson et al., The effect of phenolic acids and molasses spent wash concentration on distillery wastewater remediation by fungi. Process Biochemistry 33(8), 1998, 799-803.

Gunning et al., Production of lightweight aggregate from industrial waste and carbon dioxide, Waste Management 29 (2009) 2722-2728.

Kaushik et al., Isolation and characterization of distillery spent wash color reducing bacteria and process optimization by Taguchi approach. International Biodeterioration & Biodegradation 63 (2009) 420-426.

Pepe et al., "Doped-TIO2/Cement Matrices Photoactivematerials", Proc. of the RILEM Int. Symp. on Environment-Conscious Materials and Systems for Sustainable Development (Koriyama, Sep. 6-7, 2004).

Mane et al., Treatment of spentwash using chemically modified bagasse and colour removal studies. Bioresource Technology 97 (2006) 1752-1755.

Mohana et al., Distillery spent wash: Treatment technologies and potential applications. Journal of Hazardous Materials 163 (2009) 12-25.

Pong et al., Trans IChem E 78(B), 2000, 202-208.

Puxty et al., Comparison of the rate of $CO_2$ absorption in to aqueous ammonia and mono ethanolamine, Chemical Engineering Science 65 (2010) 915-922.

Saliha et al, Microbial and Enzyme Dynamics in Distillery Spentwash Treated Soil. Research Journal of Agriculture and Biological Sciences 1(2): 166-169, 2005.

Shah et al., Development of "green" cement for Sustainable concrete using cement kiln Dust and fly ash, International workshop on sustainable development and concrete technology, Vancouver, 1999.

Steeneveldt et al., $CO_2$ capture and storage closing the knowing—doing gap, Chemical Engineering Research and Design, 2006, 84(a9): 739-763.

Zheng et al., Performance characteristics of soil-cement from industry waste binder. Journal of materials in civil engineering, 2003, vol. 15, No. 6, pp. 616-618.

Khataee et al., Photocatalytic activity of nanostructured TiO2-modified white cement. Journal of Experimental Nanoscience, 6(2), 2011, 138-148.

Jayapalan et al., Influence of Nano-Anatase TiO2 Additions on Cement Hydration: Experiments and Modeling. International Summit on Cement Hydration Kinetics. Poster. Jul. 2009.

Jayapalan et al., Influence of Nano-Anatase TiO2 Additions on Cement Hydration: Experiments and Modeling. International Summit on Cement Hydration Kinetics. Abstract. Jul. 2009.

Derwent Abstract Accession No. 1982-97208E, Abstract for SU 897736, publication date Jan. 15, 1982.

Derwent Abstract Accession No. 1980-03084C, Abstract for SU 658103, publication date Apr. 25, 1979.

International Search Report for PCT/IB2010/054719, dated Jan. 12, 2011.

Written Opinion for PCT/IB2010/054719, dated Jan. 25, 2011.

Lepech et al., "Design of Green Engineered Cementitious Composites for Improved Sustainability", ACI Materials Journal, Nov.-Dec. 2008, pp. 567-575.

Wang et al., "Effects of curing temperatures and NaOH addition on hydration and strength development of clinker-free CKD-fly ash binders", Cement and Concrete Research 34, 2004, 299-309.

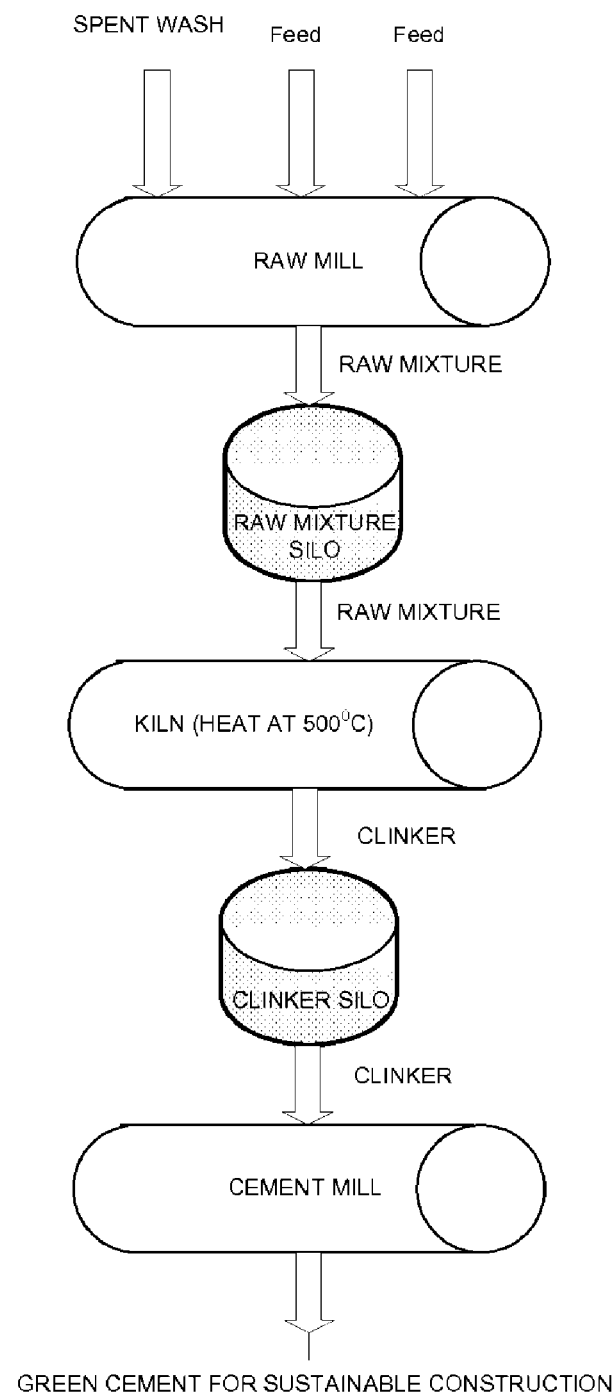

GREEN CEMENT FOR SUSTAINABLE CONSTRUCTION

The present application is a U.S. national stage application of PCT/IB2010/054719, filed Oct. 19, 2010, which claims priority to a corresponding patent application filed in India and having application number 2074/CHE/2010, filed on Jul. 20, 2010, the entire contents of which are herein incorporated by reference.

TECHNICAL FIELD

The disclosure relates to particulate feed compositions and their use for the production of cement clinker; and cement and concrete compositions.

BACKGROUND

Cement is one of the most widely used substances on the planet. Unfortunately, it is also one of the most polluting, accounting for about 5-7% of all $CO_2$ emissions. There are two major sources of $CO_2$ resulting from the production of cement. The first results from the fuel burned to produce extremely high (1450° C.) kiln temperatures needed to modify the raw materials. The second source of $CO_2$ results from calcination of limestone, which is the main binding agent of the cement. With increased focus on global warming and sustainable construction methods, environmentally friendly cement will become even more important in the future.

New binding agents and processing methods can reduce the amount of $CO_2$ generated in the production of concrete and mortar. Today, the binding agent in the most concrete and mortar is Ordinary Portland Cement (OPC), which is made by heating limestone and other materials extremely hot (1450° C.) kilns. Other current methods for reducing emissions includes the use of renewable fuels in the kiln, improved kiln efficiency and the addition of fly ash and slag as cement substitutes. Although the solutions are beneficial, they have drawbacks. For example, the use of alternative fuels adds cost, further kiln efficiency gains will likely be limited and current building codes restricts the amount of OPC-substitute materials that can be used in the construction projects.

As the world's regulatory agencies increase their focus on reducing human-generated $CO_2$, new cement alternatives could find a ready market, particularly as cement consumption continues to rise, especially in developing countries. However, "green" alternatives to traditional cement will need to have strength, handling, durability, and other characteristics that are similar to OPC at a similar cost. This is particularly relevant in developing nations, which will be unwilling or unable to support green alternatives that cover significant cost premiums compared to traditional products. Yet, the new compositions should have at least similar properties of Portland cement.

SUMMARY

In one aspect, the present disclosure provides particulate feed compositions for preparing cement clinker comprising (i) $TiO_2$, $TaO_xN_y$, $TiO_xN_y$, $RuO_2$, Pt, TaO band gap materials, or a first mixture thereof; (ii) $Al_2O_3$; and (iii) $Ca_2SiO_4$, $MgSiO_2$, $MnSiO_2$, or a second mixture thereof; wherein (i), (ii), and (iii) are present in the particulate feed composition in a weight ratio of about 1:4:5, respectively.

Another aspect of the present disclosure provides cement clinker comprising about 40 wt % $Al_2O_3$, about 30 wt % $SiO_2$, about 10 wt % $TiO_2$ and about 20 wt % spent wash.

Another aspect of the present disclosure provides methods for producing a cement clinker comprising, providing a particulate feed composition to a cement kiln; and heating the cement kiln to a temperature between about 450° C. and about 550° C. for a period of time suitable to form the cement clinker; and the cement clinker prepared according to the methods.

Another aspect of the present disclosure provides methods for producing a cement comprising, providing a particulate feed composition to a cement kiln; heating the cement kiln to a temperature between about 450° C. and about 550° C. for a period of time suitable for the formation of a cement clinker; cooling the cement clinker; and grinding the cement clinker with one or more additional materials to form the cement; and the cement prepared according to the methods.

In another aspect present disclosure provides cement comprising any one or more of the preceding cement clinker.

Another aspect of the present disclosure provides concrete comprising any one or more of the preceding cements and an aggregate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 illustrates the production stages for one of the proposed methods of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure provides methods to manufacture a cement using a spent wash (e.g., distillery waste) and the cements and concretes produced from the processes. In the proposed method, the cement can be manufactured using materials, such as, $Ca_2SiO_4$, $Al_2O_2$, $TiO_2$ and the spent wash. Melanoidin present in the spent wash can act as a binder in the cement manufacturing process. The proposed process also reduces a significant amount of the $CO_2$ generated during the process by adsorbing the $CO_2$. Using the proposed methods, the cement can be manufactured at temperatures as low as 450° C., thereby significantly reducing the amount of energy spent. The proposed cement manufacturing process not only cost-effectively utilizes the spent wash, an industrial waste, but it eliminates the efforts needed to get rid of this industrial waste.

In one aspect, the disclosure provides a particulate feed composition for preparing cement clinker comprising (i) $TiO_2$, $TaO_xN_y$, $TiO_xN_y$, $RuO_2$, Pt, TaO, band gap materials, or a first mixture thereof; (ii) $Al_2O_3$; and (iii) $Ca_2SiO_4$, $MgSiO_2$, $MnSiO_2$, or a second mixture thereof; wherein (i), (ii), and (iii) are present in the particulate feed composition in a weight ratio of about 1:4:5, respectively.

The term "band gap material" as used herein means a photoconducting, photocatalytic and/or semiconducting material. Examples of band gap materials include, but are not limited to, ZnO, Ge, $GeO_2$, Sn, $SnO_2$, Si, $SiO_2$, and alloys and mixtures thereof.

In certain embodiments, the particulate feed composition comprises (i) $TiO_2$, $TaO_xN_y$, $TiO_xN_y$, or a first mixture thereof. In certain embodiments, the particulate feed composition comprises (iii) $Ca_2SiO_4$. In certain embodiments, the particulate feed composition comprises (iii) $MgSiO_2$.

In certain other embodiments, the particulate feed composition comprises (i) $TiO_2$, (ii) $Al_2O_3$, and (iii) $Ca_2SiO_4$, $MgSiO_2$, $MnSiO_2$, or a second mixture thereof. In certain other embodiments, the particulate feed composition comprises (i) $TiO_2$, (ii) $Al_2O_3$, and (iii) $Ca_2SiO_4$ or $MgSiO_2$ or a second mixture thereof. In certain other embodiments, the particulate feed composition comprises (i) $TiO_2$, (ii) $Al_2O_3$, and (iii) $Ca_2SiO_4$. In certain other embodiments, the particulate feed composition comprises (i) $TiO_2$, (ii) $Al_2O_3$, and (iii) $MgSiO_2$.

For each of the preceding particulate feed composition sources, e.g., (i), (ii), and (iii), the median particle diameter can be less than about 5 μm. Likewise, the particulate feed composition, itself, can have a median particle diameter less than about 5 μm.

In one embodiment, the particulate feed composition further comprises a spent wash. The term "spent wash" as used herein means a waste generated from alcohol production (e.g., grain fermentation and distillation, or molasses fermentation and distillation) and/or sugar processing (e.g., processing of sugar cane or sugar beets). Suitable grain distillations can use grains including, but are not limited to, rice, barley, corn, rye, malted barley, malted rye, and wheat. As used in the compositions and methods described herein, the weight of the spent wash is calculated on a dry basis whether the spent wash is used as an aqueous solution or as a dried waste composition where the water has been substantially removed. Further elements (and their compounds) present in a spent wash solution can include, but are not limited to, C, H, O, K, Ca, Mg, S, N, P, Fe, Mn, Zn, Cu, and Si in varying amounts depending on the process parameters and the geography of the spent wash source. For example, spent wash from the processing of sugar cane in India can have a different composition than the spent wash from the barley fermentation and distillation in Germany.

In certain embodiments, the spent wash comprises melanoidin. The term "melanoidin" as used herein means the high molecular weight heterogeneous polymers that are formed when sugars and amino acids combine (through the Maillard reaction) at high temperatures and low water activity; typically formed in processing foods that have undergone some form of non-enzymatic browning. Without being limited to any one theory of operation, melanoidin is a metal chelating substance which can assist in polymerization. In certain other embodiments, the spent wash comprises a distillery spent wash and/or molasses. In certain other embodiments, the spent wash comprises molasses.

The particulate feed composition can comprise, for example, about 95 wt % to about 98 wt % of (i), (ii), and (iii), combined; and about 2 wt % to about 5 wt % of the spent wash. In certain embodiments, the particulate feed composition can comprise about 95 wt % to about 97 wt. % of (i), (ii), and (iii), combined, and about 3 wt % to about 5 wt % of the spent wash. In certain other embodiments, the particulate feed composition can comprise about 95 wt % to about 96 wt % of (i), (ii), and (iii), combined, and about 4 wt % to about 5 wt % of the spent wash. In certain embodiments, the particulate feed composition can comprise about 96 wt % to about 98 wt % of (i), (ii), and (iii), combined, and about 2 wt % to about 4 wt % of the spent wash. In certain embodiments, the particulate feed composition can comprise about 96 wt % to about 97 wt % of (i), (ii), and (iii), combined, and about 3 wt % to about 4 wt % of the spent wash. In certain embodiments, the particulate feed composition can comprise about 97 wt % to about 98 wt % of (i), (ii), and (iii), combined, and about 2 wt % to about 4 wt % of the spent wash. In certain embodiments, the particulate feed composition can comprise about 95 wt % of (i), (ii), and (iii), combined, and about 5 wt % of the spent wash. In certain embodiments, the particulate feed composition can comprise about 96 wt % of (i), (ii), and (iii), combined, and about 4 wt % of the spent wash. In certain embodiments, the particulate feed composition can comprise about 97 wt % of (i), (ii), and (iii), combined, and about 3 wt % of the spent wash. In certain embodiments, the particulate feed composition can comprise about 98 wt % of (i), (ii), and (iii), combined, and about 2 wt % of the spent wash.

Less than about 15% of the particulate feed composition should have a diameter greater than about 90 μm.

In another aspect, a cement clinker can be prepared using any of the preceding particulate feed compositions, comprising providing the particulate feed composition as described by any embodiment above to a cement kiln; and heating the cement kiln to a temperature between about 450° C. and about 550° C. for a period of time suitable to form the cement clinker. At the elevated temperatures of the method, the raw materials of the particulate feed composition can undergo calcinations and/or annealing to form the cement clinker.

In certain embodiments, the heating is for about 5 hours to about 7 hours. In other embodiments, the heating is for about 5 hours to about 6 hours. Alternatively, the temperature can be between about 450° C. and 500° C.; or between about 500° C. and 550° C.

As prepared according to the present methods, the clinker can have a porous structure. For example, the clinker can have an average pore diameter of about 100 nm to about 500 nm.

In another aspect, the present disclosure provides a cement clinker comprising about 40 wt % $Al_2O_3$, about 30 wt % $SiO_2$, about 10 wt % $TiO_2$ and 20 wt % of components from a spent wash, as described above, including, yeast, melanoidin, and either in their elemental form or their respective compounds or combinations thereof, C, K, Ca, Mg, S, N, P, Fe, Mn, Zn, and Cu. In certain embodiments, the spent wash comprises melanoidin. In certain other embodiments, the spent wash comprises molasses.

In another aspect, the present disclosure provides methods for producing a cement comprising, providing the particulate feed composition as described by any embodiment above to a cement kiln; heating the cement kiln to a temperature between about 450° C. and about 550° C. for a period of time suitable for the formation of a cement clinker; cooling the cement clinker; and grinding the cement clinker with one or more additional materials to form the cement. In certain embodiments, the heating is for about 5 hours to about 7 hours. In other embodiments, the heating is for about 5 hours to about 6 hours. Alternatively, the temperature can be between about 450° C. and 500° C.; or between about 500° C. and 550° C.

Before grinding, the clinker can be cooled to a temperature between about 10° C. and about 400° C. In certain embodiments, the clinker can be cooled to an ambient temperature (e.g., between about 10° C. and 50° C.) prior to grinding. Grinding the clinker can be according to any methods familiar to one skilled in the art. For example, grinding can be affected by a cement mill including a blending machine, a ball mill vibrator or combination of both to form the cement. The grinding process can be controlled to obtain a powder with a particle size range, in which about 15 wt % consists of particles below 5 μm diameter and about 5 wt % of particles above 45 μm. The green cement can be conveyed by a conveyor belt or powder pump to silo for storage.

The one or more additional materials for grinding with the clinker can comprise gypsum, fly ash, blast furnace slag, volcanic ash, silica fume, or a mixture thereof. In certain embodiments, the one or more additional materials can comprise gypsum. In certain embodiments, the one or more additional materials can comprise fly ash. In certain embodiments, the one or more additional materials can comprise blast furnace slag. In certain embodiments, the one or more additional materials can comprise volcanic ash. In certain embodiments, the one or more additional materials can comprise silica fume.

In yet another aspect, the present disclosure provides a cement comprising the cement clinker according to any of the preceding aspects and embodiments thereof.

In another aspect, the present disclosure provides a cement prepared as describe according to any of the preceding aspects and embodiments herein.

When $TiO_2$ is used in the present compositions and methods, the produced cement can be self-cleaning. The titanium dioxide can absorb ultraviolet light, and thereby become highly reactive toward and break down pollutants, such as oxides of nitrogen and carbon, that come into contact with the cement and/or concrete surface. Absent the $TiO_2$, pollutants may discolor the surface of the cement. For example, anatase phase $TiO_2$ added to the composition proposed herein can provide the self-cleaning property. Notably, a strong photoresponse for $TiO_2$ at a light wavelength of approximately 480 nm in room temperature can be observed after calcination at temperatures ranging from 450° C. to 500° C. On the contrary, $TiO_2$ shows a weak photoresponse when calcined at temperatures less than 400° C. or more than 550° C. Thermal gravimetry-differential scanning calorimeter-mass spectrometer (TG-DSC-MS) measurements show a significant weight loss (about 18 wt. %) of the $TiO_2$ precursor calcined in the temperature range from 400° C. to 470° C., due to the oxidation of the residual impurities in the $TiO_2$. Evolved gases were primarily composed of $H_2O$ and $CO_2$. The strong photoresponse of the $TiO_2$ under visible light may be attributed to the impurities, such as carbon or hydrocarbon compounds, mixed with or adhered on the $TiO_2$, and/or the microporous structure in the $TiO_2$.

In another aspect, the present disclosure provides a concrete comprising any of the cements described or prepared above and an aggregate. The term "aggregate" as used herein means coarse particulate material such as sand, gravel, crushed stone, and slag (e.g., waste slag from the manufacture of iron and steel) that are used with a binding medium (such as water, bitumen, portland cement, lime, etc.) to form compound materials (such as a cement concrete). The proper gradation and content of the particulate can be readily determined by one skilled in the art as appropriate for the intended use. Aggregates can either be natural or manufactured. Natural aggregates are generally extracted from larger rock formations through an open excavation (quarry). Extracted rock is typically reduced to usable sizes by mechanical crushing. Igneous, sedimentary, and metamorphic rock can be used in aggregate, including, but not limited to, granite, syenite, diorite, basalt, diabase, gabbro, limestone, sandstone, chert, shale, gneiss, schist, slate, quartzite, marble, and serpentine, and mixtures thereof. Manufactured aggregate is often the by-product of other manufacturing industries, for example, recycling of concrete.

EXAMPLES

The process of manufacturing the green cement includes production of raw mixture, production of clinker and preparation of the green cement. All of these stages for the proposed method are illustrated in FIG. 1 and described in greater detail in the following examples. The following examples are offered for illustrative purposes, and are not intended to limit the disclosure in any manner Those of skill in the art will readily recognize a variety of noncritical parameters which can be changed or modified to yield essentially the same results.

Example 1

Preparation of Green Cement

The raw materials such as $Ca_2SiO_4$, $Al_2O_3$, and $TiO_2$ which are quarried from local rocks are crushed individually (typically below 50 mm) and stored in silos. The crushed raw materials in appropriate proportions (in this case 5:4:1) are delivered onto the conveyor belt by the weigh feeders which is then fed to the raw mill. Also, spent wash is fed into the raw mill from a separate silo in a proportion of wt percentage (2%-5%) of the composition of base material. The spent wash can contain lime and $CaCO_3$. Melanoidin, another component of the spent wash, acts as a binder in the manufacturing of the green cement. The spent wash is readily available in the market and factory outlet of molasses and/or industrial distilleries.

In the raw mill, the crushed raw material and the spent wash are introduced in appropriate proportions and ground to form a raw mixture. $TiO_2$ is mixed with $Ca_2SiO_4$, $Al_2O_3$ and spent wash in the raw mill as $TiO_2$ is a self cleaning agent. In other words, $TiO_2$ prevents walls of the building from being discolored.

The raw mixture thus obtained is stored in the raw mixture silo. The fineness of the raw mixture is specified in terms of the size of the largest particles, and is usually controlled so that less than 5 wt % to 15 wt % of particles exceed 90 μm diameter to enable complete chemical reaction in the kiln and to ensure the raw mixture is chemically homogeneous.

In one embodiment, a dry process, the raw materials are dried in the raw mill, usually by passing hot exhaust gases from the kiln through the raw mill, so that the raw mixture emerges as a fine powder.

In another embodiment, a wet process, water is added to the raw mill feed and the mill product is a slurry with a moisture content usually in the range of 25 wt % to 45 wt %. In such a case, the slurry is conveyed via fluid pumps.

The spent wash in the green cement has the capacity to store 90,000 mg/Kg of $CO_2$. This is achieved by the presence of nanopores, created in the manufacturing process, in the cement. For a discussion of the absorption of $CO_2$ by the organic materials in the spent wash, see, for example, *Res. J. Agr. Biol. Sci.* 2005, 1, 166-169; and *World Appl. Sci. J.* 2009, 6, 1270-1273. The raw mixture is heated in a cement kiln, a slowly rotating and sloped cylinder, for 5-7 hrs at a fixed temperature of 500° C. Spent wash adsorbs oxides of Carbon and Nitrogen (e.g. $CO_2$, NO, $NO_2$, etc.). The $TiO_2$ in the raw mixture, when exposed to sunlight, splits the oxides of Carbon and Nitrogen into their elemental constituents. Thus, the spent wash increases the $CO_2$ adsorption capacity of the spent wash. Upon heating for a period of 5-7 hrs, the resulting material obtained is clinker. The clinker is cooled and is conveyed to storage, such as a clinker silo, via a conveyor belt.

The clinker is finely ground using additional material such as gypsum, fly ash, etc. in a cement mill including a blending machine, a ball mill vibrator or combination of both to form the green cement for sustainable construction. The grinding process is controlled to obtain a powder with a broad particle size range, in which typically 15 wt % consists of particles below 5 μm in diameter and 5 wt % consists of particles above 45 μm in diameter. The green cement is conveyed by a conveyor belt or powder pump to silo for storage.

Example 2

Preparative Example $Ca_2SiO_4$, $Al_2O_3$, $TiO_2$ and spent wash were ground and mixed together in a raw mill to create a raw mixture. The proportion of $Ca_2SiO_4$, $Al_2O_3$, $TiO_2$ to spent wash was 5:4:1 by weight %. The raw mixture was then stored in a raw mixture silo. The raw mixture was then heated in a cement kiln at 500° C. for 5-7 hours to form clinker. The heated clinker was then stored in a clinker silo and cooled down to room temperature by natural cooling. The cooled clinker was then crushed in a cement mill to produce a green cement composition.

Compression Strength Data: The cement prepared using the process and ingredients as described above were tested for compressive strength, the results are detailed below in comparison with Portland cement. Results were determined from cubes having faces of 50 $cm^2$ in area made of cement mortar, with one part cement and three parts standard sand (conforming to IS 650:1966) by weight, and water. The cement mortar cubes were 25 wt % normal consistency cement, 3 wt % sand, and the remaining 72 wt % water and crushed stone.

| Cement of Example 2 | Portland cement |
|---|---|
| 672 hrs not less than 23 MPa for 43 grade, 27 MPa for 53 grade | 721 hr not less than 23 MPa for 43 grade, 27 MPa for 53 grade |
| 1200 hrs not less than 33 MPa for 43 grade, 37 MPa for 53 grade | 1682 hrs not less than 33 MPa for 43 grade, 37 MPa for 53 grade |

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A particulate feed composition for preparing cement clinker comprising
    (i) $TiO_2$, $TaO_xN_y$, $TiO_xN_y$, $RuO_2$, Pt, TaO, band gap materials, or a first mixture thereof;
    (ii) $Al_2O_3$; and
    (iii) $Ca_2SiO_4$, $MgSiO_2$, $MnSiO_2$, or a second mixture thereof;
wherein (i), (ii), and (iii) are present in the particulate feed composition in a weight ratio of about 1:4:5, respectively.

2. The particulate feed composition of claim 1, further comprising a spent wash.

3. The particulate feed composition of claim 2, wherein the spent wash comprises melanoidin.

4. The particulate feed composition of claim 2, wherein the spent wash comprises a distillery spent wash and/or spent wash from the processing of sugar.

5. The particulate feed composition of claim 2, wherein the feed composition comprises about 95 wt % to about 98 wt % of (i), (ii), and (iii) combined, and about 2 wt % to about 5 wt % of the spent wash.

6. The particulate feed composition of claim 1, wherein less than about 15 wt % of the particulate feed composition has a diameter greater than about 90 µm.

7. A cement clinker comprising about 40 wt % $Al_2O_3$, about 30 wt % $SiO_2$, about 10 wt % $TiO_2$ and about 20 wt % spent wash.

8. A method for producing a cement clinker comprising,
    providing a particulate feed composition of claim 1 to a cement kiln;
    and heating the cement kiln to a temperature between about 450° C. and about 550° C. for a period of time suitable to form the cement clinker.

9. The method of claim 8, wherein the heating is for about 5 to about 6 hours.

10. A cement clinker prepared according to the method of claim 8.

11. The cement clinker of claim 7, wherein the clinker has a pore size of about 100 nm to about 500 nm.

12. A method for producing a cement comprising,
    providing a particulate feed composition of claim 1 to a cement kiln;
    heating the cement kiln to a temperature between about 450° C. and about 550° C. for a period of time suitable for the formation of a cement clinker;
    cooling the cement clinker; and
    grinding the cement clinker with one or more additional materials to form the cement,
wherein the one or more additional materials comprises gypsum, fly ash, blast furnace slag, volcanic ash, silica fume, or a mixture thereof.

13. The method of claim 12, wherein the heating is for about 5 to about 6 hours.

14. The method of claim 12, wherein less than about 5 wt % of the cement has a particle diameter greater than about 45 µm.

15. The method of claim 14, wherein less than about 15 wt % of the cement has a particle diameter less than 5 µm.

16. The method of claim 12, wherein the cement has a pore size of about 100 nm to about 500 nm.

17. A cement prepared according to claim 12.

18. A cement comprising the cement clinker of claim 7.

19. A concrete comprising the cement of claim 17 and an aggregate.

* * * * *

UNITED STATES PATENT AND TRADEMARK OFFICE
CERTIFICATE OF CORRECTION

| | | |
|---|---|---|
| PATENT NO. | : 8,317,917 B2 | Page 1 of 1 |
| APPLICATION NO. | : 13/390580 | |
| DATED | : November 27, 2012 | |
| INVENTOR(S) | : Arockiadoss | |

It is certified that error appears in the above-identified patent and that said Letters Patent is hereby corrected as shown below:

In Column 2, Line 32, delete "DRAWINGS" and insert -- DRAWING --, therefor.

In Column 6, Line 18, delete "manner" and insert -- manner. --, therefor.

In Column 9, Line 26, in Claim 1, delete "comprising" and insert -- comprising: --, therefor.

In Column 10, Line 18, in Claim 12, delete "comprising," and insert -- comprising: --, therefor.

Signed and Sealed this
Twenty-sixth Day of February, 2013

Teresa Stanek Rea
*Acting Director of the United States Patent and Trademark Office*